(12) United States Patent
Johnson et al.

(10) Patent No.: US 11,073,646 B2
(45) Date of Patent: Jul. 27, 2021

(54) THIN MULTILAYER REFLECTOR WITH UNIFORM LEFT BANDEDGE

(71) Applicant: 3M INNOVATIVE PROPERTIES COMPANY, St. Paul, MN (US)

(72) Inventors: Matthew B. Johnson, Woodbury, MN (US); Edward J. Kivel, Stillwater, MN (US); Ryan T. Fabick, Shoreview, MN (US); Gilles J. Benoit, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/767,368

(22) PCT Filed: Nov. 29, 2018

(86) PCT No.: PCT/IB2018/059459
§ 371 (c)(1),
(2) Date: May 27, 2020

(87) PCT Pub. No.: WO2019/106597
PCT Pub. Date: Jun. 6, 2019

(65) Prior Publication Data
US 2020/0386931 A1 Dec. 10, 2020

Related U.S. Application Data

(60) Provisional application No. 62/593,696, filed on Dec. 1, 2017.

(51) Int. Cl.
*G02B 5/28* (2006.01)
*F21V 9/20* (2018.01)
*F21V 9/30* (2018.01)
*G02B 5/08* (2006.01)
*G02B 5/26* (2006.01)

(52) U.S. Cl.
CPC ............... *G02B 5/287* (2013.01); *F21V 9/20* (2018.02); *F21V 9/30* (2018.02); *G02B 5/0816* (2013.01); *G02B 5/26* (2013.01)

(58) Field of Classification Search
CPC .............. G05B 5/0816–0875; G05B 5/26–289
See application file for complete search history.

(56) References Cited

U.S. PATENT DOCUMENTS

| 3,610,729 A | 10/1971 | Rogers |
| 4,446,305 A | 5/1984 | Rogers |
| 4,540,623 A | 9/1985 | Im |

(Continued)

FOREIGN PATENT DOCUMENTS

WO    WO 2017-106096    6/2017

OTHER PUBLICATIONS

International Search report for PCT International Application No. PCT/IB2018/059459 dated Mar. 22, 2019, 8 pages.

*Primary Examiner* — Mariceli Santiago
(74) *Attorney, Agent, or Firm* — Michael Stern

(57) ABSTRACT

Thin multilayer reflectors are described. In particular, thin multilayer reflectors that partially transmit blue light and reflect green and red light are described. The thin multilayer reflectors have a uniform left bandedge across each dimension of the film, wherein the location of the left bandedge varies in a range of no more than 10% of the average left bandedge across that dimension.

10 Claims, 4 Drawing Sheets

(56) References Cited

U.S. PATENT DOCUMENTS

| | | |
|---|---|---|
| 5,448,404 A | 9/1995 | Schrenk |
| 5,882,774 A | 3/1999 | Jonza |
| 7,104,776 B2 | 9/2006 | Merrill |
| 8,427,599 B2 | 4/2013 | O'Neill |
| 10,948,644 B2 * | 3/2021 | Nevitt .................. G02B 5/305 |
| 2001/0013668 A1 | 8/2001 | Neavin |
| 2003/0003312 A1 | 1/2003 | Aylward |
| 2007/0047080 A1 | 3/2007 | Stover |
| 2007/0216985 A1 | 9/2007 | Woodall |
| 2011/0102891 A1 | 5/2011 | Derks |
| 2011/0249334 A1 | 10/2011 | Merrill |
| 2012/0206806 A1 | 8/2012 | Weber |
| 2013/0215512 A1 | 8/2013 | Coggio |
| 2013/0250405 A1 | 9/2013 | Kivel |
| 2014/0313572 A1 * | 10/2014 | Kivel .................. G02B 5/287 |
| | | 359/359 |
| 2016/0109628 A1 * | 4/2016 | Weber .................. G02B 5/208 |
| | | 359/352 |

* cited by examiner

THIN MULTILAYER REFLECTOR WITH UNIFORM LEFT BANDEDGE

BACKGROUND

Multilayer reflectors are used for many applications, including in displays and lighting applications. Caliper variations and other nonuniformities introduced during the manufacturing process may result in reflectors that are not suitable for use in certain precision applications. A bandedge is the region or wavelength range over which a reflector transitions from primarily reflective to primarily transmissive.

SUMMARY

In one aspect, the present description relates to a multilayer optical reflector. The multilayer optical reflector includes a plurality of optical repeat units, each optical repeat unit having a total optical thickness and including a birefringent polymer and a second polymer and having an f-ratio, defined as the ratio of an optical thickness of the birefringent polymer to the total optical thickness of the optical repeat unit. The plurality of optical repeat units have a minimum optical thickness and an f-ratio such that the average transmission of unpolarized normally incident light from 400 nm to 480 nm is greater than 40%. The plurality of optical repeat units are configured such that the average transmission of unpolarized normally incident light from 550 nm to 800 nm is less than 5%. For a given position on the multilayer optical reflector, the multilayer optical reflector has a left bandedge defined at a wavelength where the transmission of unpolarized normally incident light equals 50%, the left bandedge being greater than or equal to 500 nm. Across any dimension of the multilayer optical reflector, the left bandedge varies by not more than 10% from the average left bandedge along that dimension. The multilayer optical reflector is thinner than 55 micrometers.

DETAILED DESCRIPTION

Figure 1:
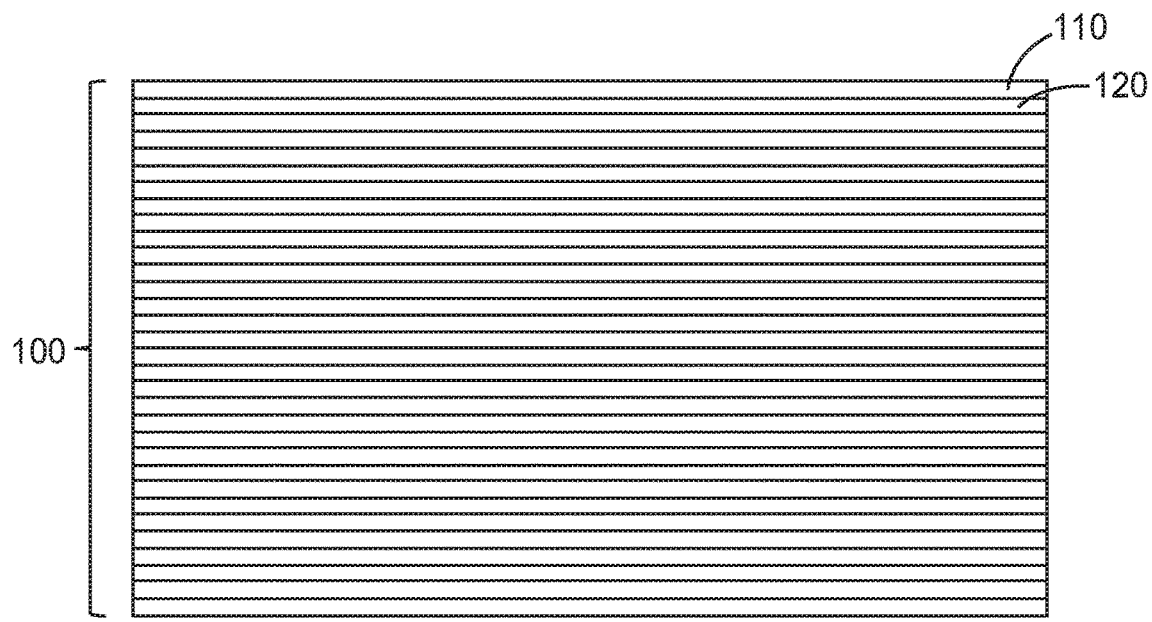
FIG. 1 is a side elevation cross-section of a thin multilayer reflector with a uniform left bandedge.

FIG. 1 is a side elevation cross-section of a thin multilayer reflector with a uniform left bandedge. Multilayer reflector 100 includes alternating high index birefringent layers 112 and low index isotropic layers 114.

Multilayer reflector 100 includes alternating microlayers of at least two different materials. Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber.

Multilayer optical films have also been demonstrated by coextrusion of alternating polymer layers, each alternating pair known as an optical repeat unit. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods. In some embodiments, at least one of the materials used in the alternating polymer layers is either polyethylene naphthalate or a copolymer that includes polyethylene terephthalate and polyethylene naphthalate. In some embodiments, at least one of the materials used in the layers capable of developing birefringence is polyethylene naphthalate or a copolymer of polyethylene naphthalate, polyethylene terephthalate, and any other monomer at a mol % less than 10%, with mol % based on the diacid monomer being 100%. Many materials and material sets are known and have been described in the art.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. The reflection band of a particular optical repeat unit (with an f-ratio of 50%, as described in more detail below) is centered around double the optical thickness of the optical repeat unit. Layers may be arranged generally as thinnest to thickest. In some embodiments, the arrangement of the alternating optical layers may vary substantially linearly as a function of layer count. These layer profiles may be referred to as linear layer profiles. In some embodiments, the thickness of the layers may be arranged monotonically. Generally, linear layer profiles are based on the overall shape of the layer arrangement, and minor or insignificant deviations from a linear layer profile would still be considered by a person having ordinary skill in the art as being a linear layer profile. In some embodiments, this may be referred to as a substantially linear layer profile. Thicker layers may be included, such as skin layers at the outer surfaces of the multilayer optical film, or protective boundary layers (PBLs) disposed within the multilayer optical films, that separate coherent groupings ("packets") of microlayers. Skin layers are sometimes added which occurs after the feedblock but before the melt exits the film die.

The multilayer melt is then cast through a film die onto a chill roll in the conventional manner for polyester films, upon which it is quenched. The cast web is then stretched by at least one of a variety of possible processes to achieve birefringence in at least one of the optical layers, producing in many cases either a reflective polarizer or mirror film, as has been described in, for example, U.S. Patent Publication No. 2007/047080 A1, U.S. Patent Publication No. 2011/0102891 A1, and U.S. Pat. No. 7,104,776 (Merrill et al.). The films, having birefringence, may be referred to as multilayer birefringent optical films.

In some embodiments, the alternating materials include a birefringent (more specifically, a layer capable of developing stress-induced birefringence) and an isotropic layer (where, at least under the same processing conditions as the birefringent layer, the layer does not develop birefringence), where the material sets and processing conditions are selected so that the indices in the in-plane directions between the birefringent and the isotropic layer are different, while in the out-of-plane direction, the indices are similar or equal. For widely used materials, the birefringent layer will have a larger index of refraction than the isotropic layer.

The f-ratio, or the ratio of the optical thickness of high index birefringent layer 110 to the total optical thickness of a layer pair (including the low index isotropic layer) in some embodiments may be 50% or within 5% of 50%. In some embodiments, the f-ratio may be greater than 50%, for example, 60%, 65%, 70%, 75%, 80%, 85%, or even 90%. In some embodiments, the inverse f-ratio (e.g., 40% versus 60%) may have substantially equivalent optical performance. For more significant deviations from 50%, depending on the relative material cost of the high index birefringent layer and the low index isotropic layer (or, in some uncommon but available material sets, a low index birefringent layer such as syndiotactic polystyrene paired with a high index isotropic layer), a certain f-ratio versus its inverse may be chosen based on the material cost of making such a film, which, over large volumes, may be or become significant.

Manipulation of f-ratios in the design of thin multilayer reflectors described herein may allow for combinations of desirable features or tuneability: for example, the specific fraction of light of a certain wavelength reflected by a multilayer stack may be altered without significantly changing the overall film thickness or changing the number of layers, enabling a thin multilayer reflector over a variety of configurations. Films described herein may be thinner than 100 micrometers, thinner than 90 micrometers, thinner than 80 micrometers, thinner than 70 micrometers, thinner than 60 micrometers, thinner than 55 micrometers, thinner than 50 micrometers, thinner than 45 micrometers, thinner than 40 micrometers, or may even be thinner than 35 micrometers.

In some embodiments, the f-ratio and the thicknesses are tuned and configured together. For example, in some embodiments, the plurality of optical repeat units have a minimum optical thickness and an f-ratio such that the average transmission of unpolarized, normally incident light from 400 nm to 480 nm is greater than 40%. As described elsewhere, this may be tuned by altering the f-ratio such that the average transmission of unpolarized, normally incident light from 400 nm to 480 nm is greater than 50%, greater than 60%, greater than 70%, or greater than 80%.

Thin multilayer reflectors as described herein may also have high reflectivity across large portions of the visible spectrum (or any other desired spectrum or wavelength range). For example, in some embodiments, the plurality of optical repeat units are configured (e.g., have a thickness, index of refraction contrast, processing conditions, f-ratio) such that the average transmission of unpolarized normally incident light from 550 nm to 800 nm is less than 5%.

Figure 2A:
FIG. 2A is a side elevation cross-section of a layer pair showing an f-ratio near 50%.
Figure 2B:
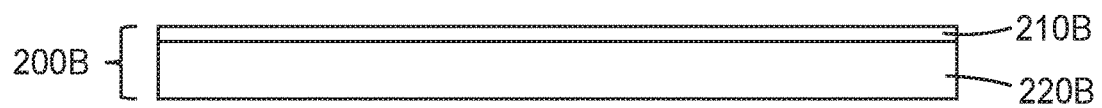
FIG. 2B is a side elevation cross-section of a layer pair showing an f-ratio less than 50%.
Figure 2C:
FIG. 2C is a side elevation cross-section of a layer pair showing an f-ratio greater than 50%.

FIG. 2A is a side elevation cross-section of a layer pair showing an f-ratio near 50%. Layer pair 200A includes birefringent high index layer 210A and isotropic low index layer 220A having approximately the same optical thickness. FIG. 2B is a side elevation cross-section of a layer pair showing an f-ratio less than 50%. Layer pair 200B includes birefringent high index layer 210B having a smaller optical thickness than isotropic low index layer 220B. FIG. 2C is a side elevation cross-section of a layer pair showing an f-ratio greater than 50%. Layer pair 200C includes birefringent high index layer 210C having a larger optical thickness than isotropic low index layer 220C. The relative physical thickness ratios are exaggerated for ease of illustration.

Figure 3:
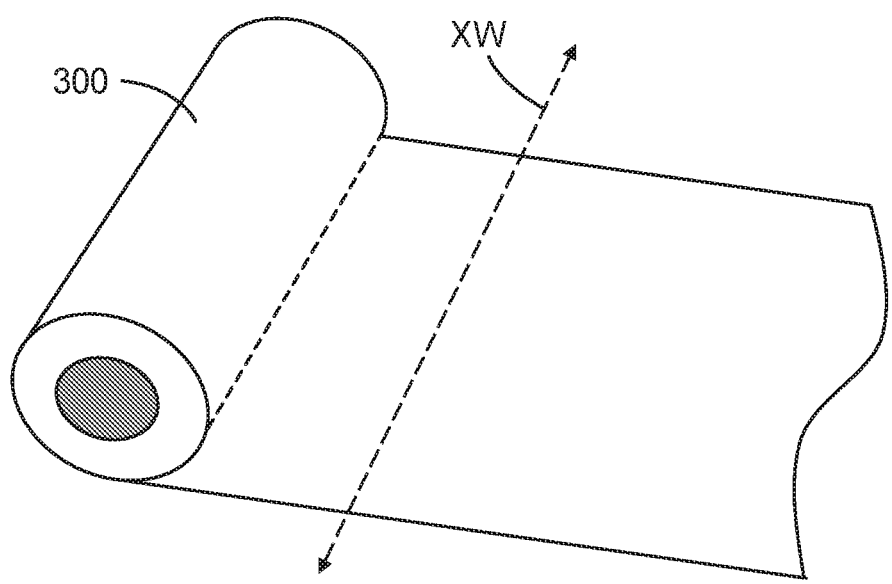
FIG. 3 is a top perspective view of a roll of the thin multilayer reflector with uniform left bandedge of FIG. 1.

FIG. 3 is a top perspective view of a roll of the thin multilayer reflector with uniform left bandedge of FIG. 1. Roll 300 as a crossweb direction XW. For a given position on the multilayer optical reflector, the multilayer optical reflector has a left bandedge defined at a wavelength where the transmission of unpolarized normally incident light equals 50%. "Left" refers to the appearance on a typical spectrum, where the x-axis increases in wavelength from left to right. This left bandedge represents the transition between the transmissive or partially reflective region of the multilayer reflector and the highly reflective region of the multilayer reflector. In some embodiments, the left bandedge is greater than or equal to 500 nm.

Multilayer reflectors are useful in displays; particularly in liquid crystal displays or other transmissive displays that utilize a backlight for uniform illumination. For particular embodiments described herein, thin multilayer reflectors may be useful for separating pump light from downconverted light, as described in more detail herein. Certain conventional reflectors have a large variation in the location of the left bandedge along a crossweb direction. The variation makes it difficult achieve uniform backlight illumination and high efficiency, resulting in lower transmission or quality for the display. Alternatively, a large quantity of material may need to be discarded in order to find a film component both properly sized and having suitable levels of left bandedge variation.

In some embodiments, across any dimension of the multilayer optical reflector, the left bandedge varies in a range of not more than 10% of the average left bandedge along that dimension. In some embodiments, the left bandedge varies in a range of not more than 5% of the average left bandedge along that dimension. For practically manufactured multilayer reflectors, due to the film processing apparatuses and certain symmetries of an effectively infinite length polymer web, the dimension of greatest variation is likely along the crossweb direction, indicated as XW in FIG. 3.

Figure 4:
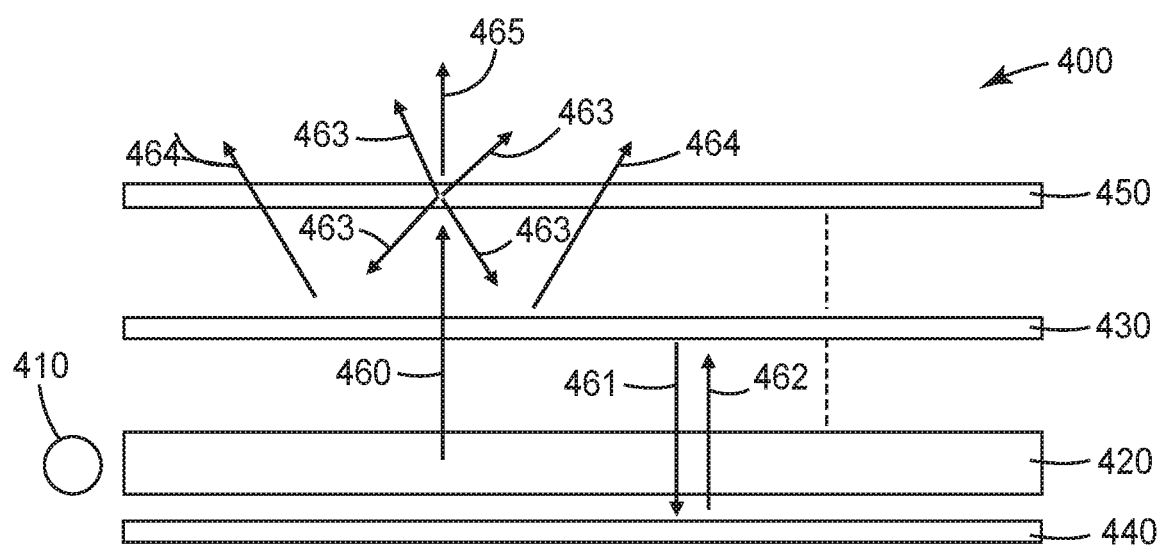
FIG. 4 is a side elevation schematic of the operational principles and configurations of a backlight including the thin multilayer reflector with uniform left bandedge of FIG. 1.

FIG. 4 is a side elevation schematic of the operational principles and configurations of an edge-lit backlight including the thin multilayer reflector with uniform left bandedge of FIG. 1. Backlight 400 include light source 410, light guide 420, thin multilayer reflector 430, back reflector 440, and downconverting layer 450. Dashed lines indicate that the layers are in optical communication, but may not necessarily be directly attached by lamination or other means. In some embodiments, adjacent films may be simply stacked on one another to preserve air gaps between those two films.

Light emitted from light source 410 is extracted from light guide 420 as light 460. Light source 410 may be any suitable light source or combination of light sources. In many cases, light source 410 is or includes light emitting diodes (LEDs). Light source 410 is referred to in the singular, but may represent a bank or series of light sources. For example, light source 410 may be a series of LEDs extended along the axis into/out of the page. In some embodiments, light source 410 emit substantially white light. In some embodiments, certain of the components light source 410 emit light of different wavelengths that may together create white light. "White" light may refer to any suitable desirable color point that may be perceived as a viewer as white light and may be adjusted or calibrated depending on the application. In some embodiments, light source 410 may emit light in one or more of the ultraviolet range, the visible range, or the near-infrared range of the electromagnetic spectrum. In some embodiments, light source 410 may emit substantially blue light, with a peak between 400 nm and 500 nm or, more specifically, with a peak between 400 nm and 480 nm. Light source 410 may also be or include cold cathode fluorescent lights (CCFLs) or even, in some embodiments, incandescent light sources. The light sources and any corresponding injection, collimation, or other optics may be selected to provide any suitable wavelength or combination of wavelengths, polarizations, point spread distributions, and degrees of collimation.

Light guides such as light guide 420 are generally solid transparent optical components that transport light through total internal reflection and have carefully designed and arranged features or specific geometries to provide control over the extraction of light along its length and/or width. In these cases, it may be useful to think of each point on the emission surface of the lightguide (in the reference frame of FIG. 4, likely the top) as being a virtual source of a light distribution cone. The design and geometry of the lightguide (such as, for example, a wedge-shaped lightguide) and the shape and distribution of extractors may alter the shape or width of such light distribution cones. Certain extractor designs may be used to emit highly collimated light at a desired angle. Light guides are typically formed from transparent material that is easy to manufacture and form, such as by injection molding. Acrylic (poly(methyl methacrylate)) is commonly used due to its transparency, low inherent birefringence, and its ability to be readily formed into desired shapes through injection molding processes, but any other suitable polymer, copolymer or blend thereof might be used to form the light guide.

Light 460 is blue light, so it is substantially transmitted through thin multilayer reflector 430 without significant absorption or reflection. In some embodiments, transmission can be higher on-axis than for blue light incident on the thin multilayer reflector at an angle, creating a collimating effect. In some embodiments, a portion of light 460 may be reflected by thin multilayer reflector 430 in order to increase the areal uniformity of emitted light from backlight 400 (specifically, by allowing light to travel downguide instead of being predominantly transmitted near the launch edge). Reflected light 461 is transmitted back through light guide 420 and is reflected by back reflector 440. Back reflector 440 may be any suitable reflector, including a metal-coated or metallized film, a white (diffuse) plastic reflector, or even a multilayer optical reflector, such as Enhanced Specular Reflector (ESR) (available from 3M Company, St. Paul, Minn.). In some embodiments, particularly where thinness may be extremely important, back reflector 440 may have only layers that reflect blue light over an extended angular range or at all incident angles, allowing for a very thin reflector design. Redirected light 462 is then directed toward thin multilayer reflector 430 again and may be transmitted this cycle or be further recycled.

Turning again to transmitted light 460, the ray is next incident on downconverting layer 450. Downconverting layer includes dispersed or coated downconverting material. Downconverting material, generally, is any material that absorbs a particular wavelength of light and reemits a second, less energetic (longer) wavelength of light. In some embodiments, the downconverting material may be or include a phosphor. In some embodiments, the downconverting material may be or include quantum dots. Downconverting layer 450 may be located at any point within the backlight or even within the display stack: in some embodiments, downconverting layer 450 may be attached to or integrated with a color filter array disposed on a liquid crystal panel.

After transmitted light 460 is incident on downconverting layer 450, at least a portion of transmitted light 460 is absorbed by downconverting material in order to be reemitted. In other words, transmitted light 460 and the downconverting material in downconverting layer 450 are selected and configured such that transmitted light 460 is pump light for the downconverting material in downconverting layer 450. Downconverting material randomly emits downconverted light 463 in all directions. Downconverted light 463 is equally likely to be emitted at useful angles for displays (for example, in a typical backlight and display construction and in the reference frame of FIG. 4, in the up direction) as it is to be emitted at non-useful angles (for example, in a typical backlight and display construction and in the reference frame of FIG. 4, back toward the lightguide and back reflector). However, thin multilayer reflector 430, in addition to working as a selective transmitted of blue light for transmitted light 460, is also a selective reflector of downconverted light 463 (for example, green or red light). Redirected downconverted light 464 is reflected back up at useful display angles and, because it is no longer pump light for the downconverting material of downconverting layer 450, is substantially transmitted and emitted toward the rest of the display not pictured in FIG. 4, along with the portion of transmitted light 460 not absorbed by downconverting layer 450, labelled as passed pump light 465. The configuration shown in FIG. 4, an edge-lit backlight, may be replaced with a direct-lit backlight in some configurations. In direct-lit configurations, the lightguide and edge-positioned light source would be replaced with an array of light sources located directly behind the other backlight film components. A diffuser, partial reflector, and/or reflector may be added for uniformity and efficiency.

EXAMPLES

Hemispherical Reflection Spectra Test Method ($R_{hemi}(\lambda)$)

Hemispheric reflection is defined as the intensity and solid-angle weighted average of the film reflectance $R(\theta,\phi)$ where $\theta$ represents the polar angle and $\phi$ represents the azimuthal angle relative to the plane of the film and where the illumination intensity, $I(\theta,\phi)$, is assumed to be Lambertian. The ratio of the total flux of the reflected light to the total flux of the incident light for the wavelength range of interest yields the hemispheric reflectivity, $R_{hemi}(\lambda)$. The hemispheric reflectivity, $R_{hemi}(\lambda)$, for the examples of this case was measured using an apparatus described previously in US Pat. App. Pub. No. 2013/0215512 (Coggio et al.).

A commercial six inch integrating sphere manufactured by Labsphere (Labsphere, Inc., North Sutton, N.H.) and having a SPECTRALON reflective coating, with three mutually orthogonal ports for source, sample and reference, respectively, was used to measure the hemispherical reflectance spectrum, $R_{hemi}(\lambda)$. A stabilized light source illuminated the sphere through the first port. A PR650 spectrophotometer (available from Photo Research Inc., Chatsworth, Calif.) was used to measure the sphere internal wall radiance through the second port. The third port location is for the sample to be measured or calibration standard (SPECTRALON Reference Target SRT-99-050 available from Labsphere, Inc., North Sutton, N.H.).

To calibrate the system, the calibration standard is placed on the third port in the sample measurement location. The sphere-wall radiance is then measured from the second port location both with and without the calibration standard in the third port. The measurement of hemispherical reflection ($R_{hemi}$) for each wavelength is then derived as the ratio of the measured value with and without the sample affixed at the third port; the collection of data points for each wavelength across the range 400-1200 nm was collected to make up the hemispherical reflectance spectrum, $R_{hemi}(\lambda)$.

$R_{hemi}(\lambda)$ may also be calculated as described in PCT Publication WO 2017/106096 A1 (Kivel et al.) from information on the layer thickness profiles of microlayers and the other layer elements of the optical film and from the refractive index values that are associated with each of the microlayers and other layers within the film. By using a 4×4 matrix-solving software application for the optical response of a multilayer film, both the reflection and transmission spectra can be calculated from the known layer thickness profile(s) and refractive index properties for the x-axis plane of incidence and for the y-axis plane of incidence and for each of p-polarized and s-polarized incident light. From this, $R_{hemi}(\lambda)$ may be calculated by use of the equations listed below:

$$R_{hemi}(\lambda) = \left(\frac{R^{x\text{-}axis}(\lambda) + R^{y\text{-}axis}(\lambda)}{2}\right) * (1/Enorm),$$

where $$R^{x\text{-}axis}(\lambda) = \frac{1}{2}\int_0^{\pi/2} \{R_{pp-x}(\theta, \lambda) + R_{ss-x}(\theta, \lambda)\} * E(\theta)d\theta,$$

$$R^{y\text{-}axis}(\lambda) = \int_0^{\pi/2} \{R_{ss-y}(\theta, \lambda) + R_{pp-y}(\theta, \lambda)\} * E(\theta)d\theta,$$

and $$Enorm = \int_0^{\pi/2} E(\theta)d\theta,$$

where $E(\theta)$ is the intensity distribution.

Substantive agreement between measured and calculated profiles in, for example, Kivel et al., have validated that the computational technique captured the relevant physics of reflection from a broadband visible reflector, including the effects of absorptive losses on the detailed reflection spectra.

Transmission/Reflection Spectra Test Method

Figure 5:
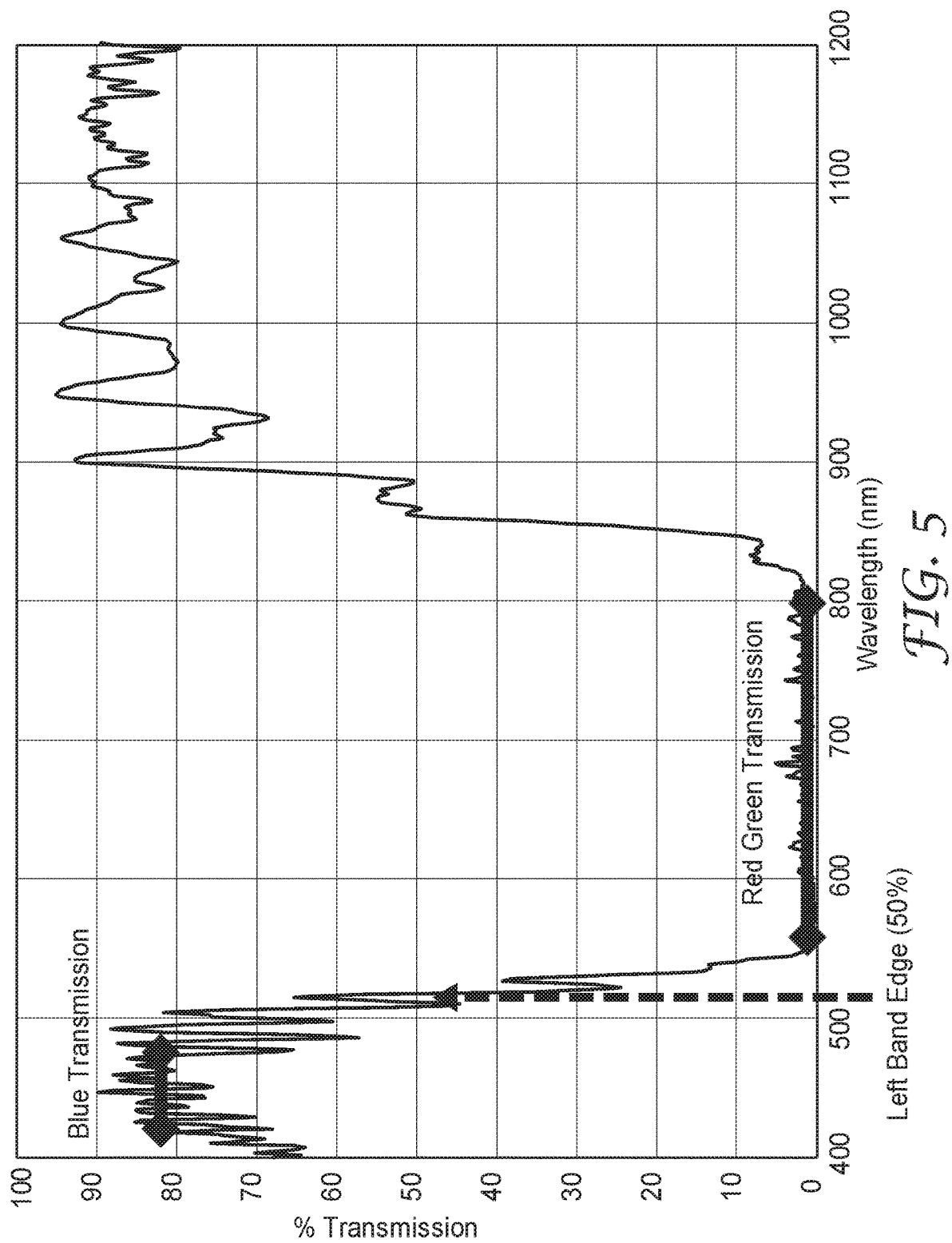
FIG. 5 is a chart of a representative blue light transmitting, green and red reflecting mirror film spectrum.

All spectral transmission and reflection properties were measured using a PERKINELMER LAMBDA 950 (available from PerkinElmer, Waltham, Mass.) over a wavelength range from 350 nm to 1500 nm. For purposes of reporting results from portions of the spectral response, blue light transmission is defined as the average measured % transmission for 420-480 nm range from the measured spectrum. The red and green light transmission collectively is defined as the average measured % transmission for 550-800 nm portion of the spectrum. The left bandedge (LBE) is defined as the point in the measured spectrum between blue and green portions where the measured % transmission equals 50%. Lastly, the right bandedge (RBE) is defined as the point in the measured spectrum near 800 nm where the transmission equals 50%. Both the average wavelength for the left and right band edges and the variability or range of the wavelength for the left and right band edges are important parameters. These data are reported in results from measurements taken every 2.5 inches across the 60 inch web. Both average positions and range of bandedge affect perceived quality for the display performance. FIG. 5 depicts blue transmission, red and green transmission, and left band edge from a representative transmission spectrum.

Color Measurement Test Method

Color measurements for CIE color coordinates were conducted with the ELDIM L80 (available from VC Probe Systems, Saint-Claire, France). A cube shaped light source as described previously in U.S. Pat. No. 8,427,599 provided the light source for the color measurements and description included here for reference. This illumination source for the color measurements was a cube with sides approximately 13 cm long constructed of panels of diffuse white TEFLON polytetrafluoroethylene material. Light was introduced into the inside of the cube by a fiber optical bundle. Multiple reflections interior to the cube served to homogenize the light and resulted in highly uniform, homogenous output from the surfaces of the cube. First, a reference measurement was taken of the top face of the illumination device by itself. Then, the CIE(x,y) color metrics were measured for each of the samples as they were affixed onto the light cube. Repeated measurement for each of 7 samples from across the web surface were gathered as follows. Coating samples of 5"×5" size were taken from equal 10" intervals across the 60" web. Sample A was taken at first edge at position 0". Sample B was taken at position 10" from first edge. Sample C was taken at position 20" from first edge. Sample D was taken at position 30" from first edge. Sample E was taken at position 40" from first edge. Sample F was taken at position 50" from first edge. Sample G was taken at 60" from first edge which coincides with second edge. In this manner, samples labelled A-G for each web slice were measured to be used to represent cross-web variation.

Comparative Example 1 (CE1)

A blue transmitting green and red reflecting mirror film (hereafter, "BT-GRM film") was prepared by co-extrusion and biaxial orientation as described in U.S. Pat. App. Pub. No. 2001/0013668 (Neavin et al.), with exceptions as follows. The first optical layers were polyethylene naphthalate (PEN) homopolymer (100 mol % naphthalene dicarboxylate with 100 mol % ethylene glycol) having a glass transition temperature, Tg, of 121-123° C. The second optical polymer layers were a poly(methyl methacrlate) or PMMA, available, for example, from Arkema, Pasadena, Tex., and has a Tg of 100° C. The polymer used for the skin layers was the same material used in the first optical layers.

The materials were fed from separate extruders to a multilayer coextrusion feedblock, in which they were assembled into alternating optical layers. The skin layers were added to the construction in a manifold specific to that purpose, resulting in a final construction having 656 layers. The multilayer melt was then cast through a film die onto a chill roll, in the conventional manner for polyester films, upon which it was quenched. The cast web was then stretched in a commercial scale biaxial tenter at temperatures and draw profiles similar to those described in Neavin et al. The film was measured for physical thickness by a capacitance gauge to be approximately 99.3 µm as measured using an ONO-SOKKI DG-925 micrometer.

Comparative Example 2 (CE2)

A BT-GRM film was prepared by co-extrusion and biaxial orientation as described in U.S. Pat. App. Pub. No. 2001/0013668 (Neavin et al.), with exceptions as follows. The first optical layers were polyethylene terephthalate (PET) homopolymer (100 mol % terephthalic acid with 100 mol % ethylene glycol) having a Tg of 81-83° C. The second optical polymer layers were a copolymer of poly(methyl methacrlate) or coPMMA, available, for example, from Plaskolite, Columbus, Ohio, under the tradename OPTIX and has a Tg of 80° C. The polymer used for the skin layers was the same material used in the first optical layers.

The materials were fed from separate extruders to a multilayer coextrusion feedblock, in which they were assembled. The skin layers were added to the construction in a manifold specific to that purpose, resulting in a final construction having 706 layers. The multilayer melt was then cast through a film die onto a chill roll, in the conventional manner for polyester films, upon which it was quenched. The cast web was then stretched in a commercial scale biaxial tenter at temperatures and draw profiles similar to those described to those described in Neavin et al. The film was measured for physical thickness by a capacitance gauge to be approximately 86.1 µm as measured using an ONO-SOKKI DG-925 micrometer.

Example 1 (E1)

A BT-GRM film was prepared by co-extrusion and biaxial orientation as described in U.S. Pat. App. Pub. No. 2001/0013668 (Neavin et al.), with exceptions as follows. The first optical layers were polyethylene terephthalate (PET) homopolymer (100 mol % terephthalic acid with 100 mol % ethylene glycol) having a Tg of 81-83° C. The second optical polymer layers were a copolymer of poly(methyl methacrlate) or coPMMA, available, for example, from Plaskolite, Columbus, Ohio, under the tradename OPTIX and has a Tg of 80° C. The polymer used for the skin layers was the same material used in the first optical layers.

The materials were fed from separate extruders to a multilayer coextrusion feedblock, in which they were assembled. The skin layers were added to the construction in a manifold specific to that purpose, resulting in a final construction having 429 layers. The multilayer melt was then cast through a film die onto a chill roll, in the conventional manner for polyester films, upon which it was quenched. The cast web was then stretched in a commercial scale biaxial tenter at temperatures and draw profiles similar to those described to those described in Neavin et al. The film was measured for physical thickness by a capacitance gauge to be approximately 54.9 µm as measured using an ONO-SOKKI DG-925 micrometer.

Examples 2-5 (E2-E5)

A series of BT-GRM films with improved optical uniformity were prepared by co-extrusion and biaxial orientation as described in U.S. Pat. App. Pub. No. 2001/0013668 (Neavin et al.), with exceptions as follows. The first optical layers were polyethylene naphthalate (PEN) homopolymer (100 mol % naphthalene dicarboxylate with 100 mol % ethylene glycol) having a Tg of 121-123° C. The second optical polymer layers were a poly(methyl methacrlate) or PMMA, available, for example, from Arkema, Pasadena, Tex., and has a Tg of 100° C. The polymer used for the skin layers was the same material used in the first optical layers.

The materials were fed from separate extruders to a multilayer coextrusion feedblock, in which they were assembled. Each example had slightly different design characteristics resulting in differently tuned blue transmission. The skin layers were added to the construction in a manifold specific to that purpose, resulting in a final construction having 329 layers. The multilayer melt was then cast through a film die onto a chill roll, in the conventional manner for polyester films, upon which it was quenched. The cast web was then stretched in a commercial scale biaxial tenter at temperatures and draw profiles similar to those described to those described in Neavin et al. The films represented as Examples E2-E5 were measured for physical thickness by a capacitance gauge to be between 48 to 48.5 µm by an ONO-SOKKI DG-925 micrometer.

Test Results Examples C1, C2, E1-E5

As observed in Table 1, Examples E2-E5 have varying levels of blue light transmission while keeping other characteristics of the film unchanged. The ability to vary blue light transmission is important for this display application as there is a trade-off between display efficiency and display luminance uniformity as the blue light transmission of this film changes. Generally, lower blue light transmission levels will increase display luminance uniformity while higher blue light transmission levels will increase display efficiency.

TABLE 1

Examples and corresponding properties: material, optical and physical

| Example | Layer 1 | Layer 2 | LBE Avg [nm] | LBE Range [nm] | Avg % Trans [420-480 nm] Blue Trans. | Avg % Trans [550-800 nm] Red Green Transmission | RBE Avg [nm] | Thickness [µm] |
|---|---|---|---|---|---|---|---|---|
| E1 | PET | coPMMA | 516 | 17.1 | 83 | 2.1 | 853 | 54.9 |
| E2 | PEN | PMMA | 517 | 34.8 | 79 | 0.7 | 1055 | 48.0 |
| E3 | PEN | PMMA | 520 | 39.3 | 67 | 0.7 | 1068 | 48.5 |
| E4 | PEN | PMMA | 518 | 40.6 | 56 | 0.8 | 1076 | 48.5 |
| E5 | PEN | PMMA | 505 | 45.2 | 48 | 0.8 | 1068 | 48.5 |
| C1 | PEN | PMMA | 515 | 41.0 | 60 | 0.2 | 1185 | 99.3 |
| C2 | PET | coPMMA | 514 | 14.0 | 79 | 4.7 | 1061 | 86.1 |

Further, the E1 through E5 BT-GMR films possess acceptable left band edge uniformity as compared to C1 or C2 with thinner films over a range of blue light transmission levels, even though similar first and second layer materials are utilized. The uniformity of the left band edge position is critical to providing a display that is spatially uniform in color and luminance.

BL-GRM spectral effect on display color was evaluated by taking 5×5 inch samples at increments of 10 inches across the entire 60 inch wide web: at 0, 10, 20, 30, 40, 50, 60 inches; seven samples per condition. Next, using an ELDIM L80 spectrophotometer and cube light source as described elsewhere, the "white state" CIE (x,y) color performance was measured for each of the seven 5×5 inch samples from select BL-GRM films. After x and y measurement, the data range for each sample was calculated and reported in Table 2 as a measure of the display color uniformity.

TABLE 2

Color range for 'x' and 'y' for select BL-GRM films as measured with an Eldim L80 and the LBE range when reported for transmittance at 50% for the range of full set of (7) cross-web samples.

| Example | Cross-web range for CIE color X | Cross-web range for CIE color Y | LBE Range at 50% T [nm] |
|---|---|---|---|
| C1 | 0.0759 | .1378 | 41.0 |
| E1 | .007 | .0223 | 17.1 |
| E2 | .0161 | .0271 | 34.8 |

As observed from the data in Table 2, as the LBE range increases so does the x and/or y color response range. While the specific changes in color are not exactly linear, the general trend holds.

Examples 6-14 (E6-E14)

In additional to in-device testing, optical modeling was employed to explore display performance beyond that shown in Table 2. In these modelled examples, the following methodology was undertaken to measure what is label as the backlight unit (BLU) spectrum. For each condition, the BLU spectrum was computed using a two-stream approximation in a recycling model as follows: blue light was injected into a first recycling cavity lined with a back reflector on one side and the blue-pass reflector on the other. Blue light transmitted through the blue-pass mirror was transmitted into a second recycling cavity lined by the blue-pass mirror and a phosphor layer on one side, and a crossed prism film and reflecting polarizer (XBEF and DBEF, both available from 3M Company, St. Paul, Minn.) stack on the other. Blue light incident on the phosphor layer was partially absorbed and converted to green and red light with each pass. Total absorption and conversion was a function of the amount of recycling, which was modeled as a convergent infinite series. A similar calculation was conducted for green and red light such that the amount of light transmitted through the brightness enhancement stack was determined for all possible wavelengths comprising the final BLU spectrum. That spectrum formed the basis to compute performance characteristics such as intensity, brightness, white point coordinates and efficiency relative to the blue light emitted at the source.

The back reflector, BT-GRM film and brightness enhancement film stack were all characterized by their hemispheric reflectivity ($R_{hemi}$), transmission ($T_{hemi}$) and absorption ($A_{hemi}=1-R_{hemi}-T_{hemi}$) spectra. $R_{hemi}$ is defined as the solid-angle average of $R(\theta,\phi)$, where $\theta$ refers to the polar angle measured from the surface normal and $\phi$ to the azimuthal angle. For the back reflector, consisting of MCPET Microcellular Reflective Sheet (available from Furukawa Electric, Tokyo, Japan)+LEDs, $R(\theta,\phi)$ was assumed to be constant with angle. For the recycling stack, consisting of BEF4-GT+BEF4-GMv5+APF-V3 (from 3M Co), $R_{hemi}$ was measured directly using the hemispherical measurement system. For the BL-GRM film reflector, $R(\theta,\phi)$ was computed using the Transfer Matrix Method given a layer profile and constitutive materials (PEN, PET for the high-index material, PMMA for the low index material).

The phosphor layer located above the BL-GRM film reflector was characterized by the intrinsic absorption and emission spectra of the phosphor materials and two independent optical densities which is labeled as ODG (Optical Density Green) and ODR (Optical Density Red). These densities are derived from single-pass absorption coefficients such that the measured green phosphor absorption=1-$10^{-ODG}$ and the measured red phosphor absorption=1-$10^{-ODR}$. In simulation Examples E6-E14, the optical absorption parameters were chosen to correspond with commercially available green phosphor "G535A Sr Ga2S4:EU" from Mitsui Mining & Smelting Co., Ltd (Tokyo, Japan). and commercially available red phosphor "K2SiF6MnIV" from GE Materials (East Cleveland, Ohio). The corresponding emission and absorption spectra were obtained from published literature for these commercial materials.

All computations were conducted in Matlab from Mathworks Inc. Accuracy of the model has been tested against measured data.

In Examples E6-E14, the BLU spectrum white point was controlled to a specific point (x=0.278, y=0.256 in CIE 1931 xy diagram) by adjusting the optical densities ODG and ODR so that the impact of the BL-GRM mirror on efficiency and brightness could be quantified without the confounding effect of white point color variation.

TABLE 3

Examples E6-E14 are the representative BT-GRM film properties utilized to model display performance or backlight (BLU) efficiency with various backlight reflectivity levels (labelled Rback). Physical versions of these modelled examples could be fabricated by means previously exemplified in E1 by adjusting the number of layers, materials and process conditions to hit this range of RBE targets. Note that modelled example E9 is very similar in properties to E1.

| Example | Layer 1 | LBE [nm] | RBE [nm] | RhemiPh | RhemiB | RhemiGR |
|---|---|---|---|---|---|---|
| 6 | PET | 515 | 750 | .942 | .794 | .625 |
| 7 | PET | 515 | 800 | .969 | .791 | .745 |
| 8 | PET | 515 | 820 | .976 | .789 | .797 |
| 9 | PET | 515 | 850 | .973 | .788 | .845 |
| 10 | PET | 515 | 900 | .969 | .785 | .912 |
| 11 | PET | 515 | 950 | .962 | .783 | .949 |

TABLE 3-continued

Examples E6-E14 are the representative BT-GRM film properties utilized to model display performance or backlight (BLU) efficiency with various backlight reflectivity levels (labelled Rback). Physical versions of these modelled examples could be fabricated by means previously exemplified in E1 by adjusting the number of layers, materials and process conditions to hit this range of RBE targets. Note that modelled example E9 is very similar in properties to E1.

| Example | Layer 1 | LBE [nm] | RBE [nm] | RhemiPh | RhemiB | RhemiGR |
|---------|---------|----------|----------|---------|--------|---------|
| 12 | PET | 515 | 1000 | .954 | .781 | .961 |
| 13 | PET | 515 | 1050 | .942 | .778 | .959 |
| 14 | PET | 515 | 1100 | .933 | .776 | .950 |

Figure 6:
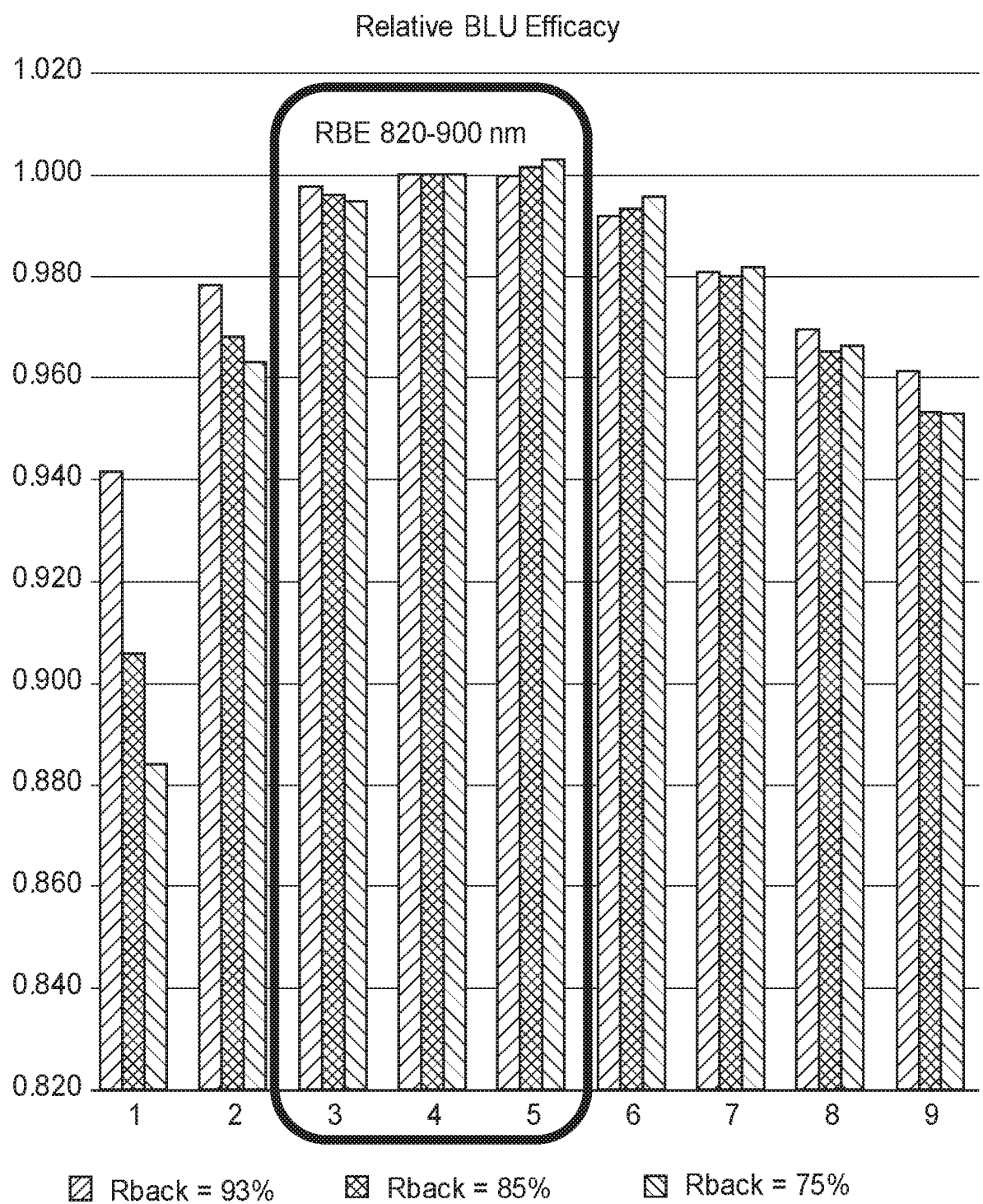
FIG. 6 is a graph showing backlight efficiency as a function of right bandedge location.

These optical modeling examples demonstrate BLU performance as a function of design for RBE over the range of 750 nm to 1100 nm. These results are plotted in FIG. 6. The left bandedge (LBE) and right bandedge (RBE) columns list wavelength for which % T crosses the 50% level. RhemiPh is the photopically-weighted average of the modeled blue-pass mirror hemispheric reflectivity. RhemiB is the modelled blue-pass mirror hemispherical reflectivity for the blue portion of the spectrum (400-480 nm). RhemiGR is the modelled blue-pass mirror hemispherical reflectivity for the green and red portions of the spectrum (480–RBE). As observed in FIG. 6, the BLU efficiency results appear to be optimal for conditions 3-5 (Examples E8-E10) where RBE targets are between 820-900 nm.

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

The following are exemplary embodiments according to the present disclosure:

Item 1. A multilayer optical reflector, comprising:
 a plurality of optical repeat units, each optical repeat unit having a total optical thickness and including a birefringent polymer and a second polymer and having an f-ratio, defined as the ratio of an optical thickness of the birefringent polymer to the total optical thickness of the optical repeat unit;
 wherein the plurality of optical repeat units have a minimum optical thickness and an f-ratio such that the average transmission of unpolarized normally incident light from 400 nm to 480 nm is greater than 40%;
 wherein the plurality of optical repeat units are configured such that the average transmission of unpolarized normally incident light from 550 nm to 800 nm is less than 5%;
 wherein, for a given position on the multilayer optical reflector, the multilayer optical reflector has a left bandedge defined at a wavelength where the transmission of unpolarized normally incident light equals 50%, the left bandedge being greater than or equal to 500 nm;
 wherein, across any dimension of the multilayer optical reflector, the left bandedge varies within a range of not more than 10% of the average left bandedge along that dimension; and
 wherein the multilayer optical reflector is thinner than 80 micrometers.

Item 2. The multilayer optical reflector of item 1, wherein the birefringent polymer includes polyethylene naphthalate or a copolymer thereof and the multilayer optical reflector is thinner than 50 micrometers.

Item 3. The multilayer optical reflector of item 1, wherein the f-ratio is different than 50%.

Item 4. The multilayer optical reflector of item 1, wherein the plurality of optical repeat units are configured such that the average transmission of unpolarized normally incident light from 550 nm to 800 nm is less than 1%.

Item 5. The multilayer optical reflector of item 1, wherein the plurality of optical repeat units have a minimum optical thickness and an f-ratio such that the average transmission of unpolarized normally incident light from 400 nm to 480 nm is greater than 50%.

Item 6. The multilayer optical reflector of item 1, wherein the plurality of optical repeat units have a minimum optical thickness and an f-ratio such that the average transmission of unpolarized normally incident light from 400 nm to 480 nm is greater than 60%.

Item 7. The multilayer optical reflector of item 1, wherein the plurality of optical repeat units have a minimum optical thickness and an f-ratio such that the average transmission of unpolarized normally incident light from 400 nm to 480 nm is greater than 70%.

Item 8. The multilayer optical reflector of item 1, wherein the birefringent polymer includes polyethylene terephthalate or a copolymer thereof, and the plurality of optical repeat units have a minimum optical thickness and an f-ratio such that the average transmission of unpolarized normally incident light from 400 nm to 480 nm is greater than 80%.

Item 9. The multilayer optical reflector of item 1, wherein across any dimension of the multilayer optical reflector, the left bandedge varies within a range of not more than 5% of the average left bandedge along that dimension.

Item 10. An extended area light source, comprising:
 a blue light source, wherein the blue light source has a maximum emitted wavelength between 420 nm and 480 nm;
 a downconverting material, wherein the downconverting material absorbs light emitted from the blue light source and reemits light having a wavelength between 550 and 800 nm; and
 the multilayer optical reflector of any of the preceding claims, wherein the multilayer optical reflector is disposed in an optical path between the blue light source and the downconverting material.

Item 11. The extended area light source of item 10, wherein the blue light source includes light emitting diodes.

Item 12. The extended area light source of item 10, wherein the downconverting material includes a phosphor.

Item 13. The extended area light source of item 10, wherein the downconverting material includes quantum dots.
Item 14. The extended area light source of item 10, further including a lightguide, disposed in an optical path between the blue light source and the downconverting material.
Item 15. The extended area light source of item 10, further including a back reflector, disposed in an optical path to reflect light reflected by the multilayer optical reflector.
Item 16. The extended area light source of item 10, wherein the downconverting material is within a downconverting film, and the downconverting film is within 10% of an area of the multilayer optical reflector.
Item 17. The extended area light source of item 10, wherein the downconverting material is within a color filter array.
Item 18. An optical cavity, comprising:
  the multilayer optical reflector of any of claims 1-9; and
  a reflector disposed proximate and within 10 degrees of parallel from the multilayer optical reflector;
  wherein the reflector having an average hemispheric reflectivity of at least 95% for unpolarized light having a wavelength between 420 nm and 480 nm.
Item 19. The optical cavity of item 18, wherein the reflector is a multilayer optical reflector and has an average reflectivity less than 50% for unpolarized light having a wavelength between 550 nm and 800 nm.
Item 20. The optical cavity of item 18, further comprising a lightguide disposed between the multilayer optical reflector and the reflector.

What is claimed is:

1. A multilayer optical reflector, comprising:
  a plurality of optical repeat units, each optical repeat unit having a total optical thickness and including a birefringent polymer and a second polymer and having an f-ratio, defined as the ratio of an optical thickness of the birefringent polymer to the total optical thickness of the optical repeat unit;
  wherein the plurality of optical repeat units have a minimum optical thickness and an f-ratio such that the average transmission of unpolarized normally incident light from 400 nm to 480 nm is greater than 40%;
  wherein, for a given position on the multilayer optical reflector, the multilayer optical reflector has a left bandedge defined at a wavelength where the transmission of unpolarized normally incident light equals 50%, the left bandedge being greater than or equal to 500 nm;
  wherein, across any dimension of the multilayer optical reflector, the left bandedge varies within a range of not more than 10% of the average left bandedge along that dimension;
  wherein the multilayer optical reflector is a selective reflector of green and red light; and
  wherein the multilayer optical reflector is thinner than 100 micrometers.

2. The multilayer optical reflector of claim 1, wherein the birefringent polymer includes polyethylene naphthalate or a copolymer thereof and the multilayer optical reflector is thinner than 80 micrometers.

3. The multilayer optical reflector of claim 1, wherein the f-ratio is different than 50%.

4. The multilayer optical reflector of claim 1, wherein the plurality of optical repeat units are configured such that the average transmission of unpolarized normally incident light from 550 nm to 800 nm is less than 5%.

5. The multilayer optical reflector of claim 1, wherein the plurality of optical repeat units have a minimum optical thickness and an f-ratio such that the average transmission of unpolarized normally incident light from 400 nm to 480 nm is greater than 50%.

6. The multilayer optical reflector of claim 1, wherein the birefringent polymer includes polyethylene terephthalate or a copolymer thereof, and the plurality of optical repeat units have a minimum optical thickness and an f-ratio such that the average transmission of unpolarized normally incident light from 400 nm to 480 nm is greater than 80%.

7. The multilayer optical reflector of claim 1, wherein across any dimension of the multilayer optical reflector, the left bandedge varies within a range of not more than 5% of the average left bandedge along that dimension.

8. An extended area light source, comprising:
  a blue light source, wherein the blue light source has a maximum emitted wavelength between 420 nm and 480 nm;
  a downconverting material, wherein the downconverting material absorbs light emitted from the blue light source and reemits light having a wavelength between 550 and 800 nm; and
  the multilayer optical reflector of any of the preceding claims, wherein the multilayer optical reflector is disposed in an optical path between the blue light source and the downconverting material.

9. The extended area light source of claim 8, wherein the downconverting material is within a downconverting film, and the downconverting film is within 10% of an area of the multilayer optical reflector.

10. The extended area light source of claim 8, wherein the downconverting material is within a color filter array.

* * * * *